UNITED STATES PATENT OFFICE.

GEORGE E. DUNTON, OF NEW YORK, N. Y.

COMPOSITION OF MATTER FOR USE IN REMOVING GREASE, &c., FROM THE MOLDS USED IN THE ART OF ELECTROTYPING.

1,040,908.     Specification of Letters Patent.     Patented Oct. 8, 1912.

No Drawing.     Application filed September 6, 1910. Serial No. 580,539.

*To all whom it may concern:*

Be it known that I, GEORGE E. DUNTON, residing at New York, county of New York, State of New York, a citizen of the United States, have invented certain new and useful Improvements in Compositions of Matter for Use in Removing Grease, &c., from the Molds Used in the Art of Electrotyping; and I do hereby declare the following to be a full, clear, and exact description of the invention, such as will enable others skilled in the art to which it pertains to make and use the same.

The material for forming molds used in the electrotyping art for the production of printing plates is commonly made of some substance such as beeswax, ozocerite wax or like material which contain an appreciable percentage of grease, oil or oily substance in their composition. When pressure is applied to a form or cut in making the impression in the mold, it causes the grease or oily substance to be forced out and appear on the face of the mold in the form of a thin coating or film, said coating or film is very troublesome and annoying to the electrotyper as it causes imperfect and faulty reproductions, especially in case where the so-called half tone illustrations are being made which are composed or made up of a collection of very fine dots.

My invention relates to a new and useful composition for curing the above fault which is especially adapted for use in dissolving, disintegrating and removing grease, oil, or other fatty substances from the pressed surfaces of wax molds used in the art of electrotyping preparatory to applying a black lead or other coating to the mold.

The composition consists of the following ingredients in about the proportions stated:—methyl alcohol 8000 cubic centimeters, caustic soda 55 grams, chlorin gas 2 thousand cubic centimeters, water 1000 cubic centimeters.

In compounding the composition, I first provide a suitable receptacle and pour into the same 8000 cubic centimeters of methyl alcohol, to this alcohol add 2 thousand cubic centimeters of chlorin gas, which has been previously dissolved in 1000 cubic centimeters of water to saturation, while stirring the solution briskly, and finally add 55 grams of caustic soda and continue the stirring until the same is dissolved and the solution takes on a reddish tinge. I rely upon the action that occurs between the mixture, or as a result of the mixture, of chlorin, alcohol and caustic soda to produce the results hereafter described and set forth.

This composition is to be placed in a lead lined trough or receptacle of sufficient size to take the largest size mold, when it is ready for use, but it should be stirred occasionally to keep the chlorin and other elements mixed. The composition may be poured over the surface of the wax mold or the mold may be immersed or dipped into the composition as is desired.

The above composition acts to break up and dissolve the constituent parts of the grease, oil or other substance appearing on the surface of the mold and destroys the cohesion between the several elements composing the grease, oil or other substance so as to permit of its easy removal from the surface of the mold.

I do not wish to confine myself to the exact proportion of each ingredient as stated, as they may be varied, and other combinations may be made to produce the same results and still come within the scope and spirit of my invention.

What I claim is:—

1. A composition for use in removing grease, oil or fatty substances from molds, used in the art of electrotyping, the constituent ingredients of which are alcohol, caustic alkali and chlorin gas dissolved in water, substantially as described.

2. A composition for use in removing grease, oil or fatty substances from molds, used in the art of electrotyping, the constituent ingredients of which are methyl alcohol, caustic alkali and free chlorin gas dissolved in water, substantially as described.

3. A composition for use in removing grease, oil or fatty substances from molds, used in the art of electrotyping, the constituent ingredients of which are methyl alcohol eight hundred cubic centimeters, chlorin gas two thousand cubic centimeters, water one thousand cubic centimeters and caustic soda fifty five grams, substantially as described.

In testimony whereof, I affix my signature in the presence of two witnesses.

GEORGE E. DUNTON.

Witnesses:
H. BECKER,
FRANCIS S. DUFF.